M. H. MANSFIELD.
Improvement in Thrashing-Machines and Separators.
No. 115,223.                              Patented May 23, 1871.

Witnesses.
R. T. Campbell
J. N. Campbell

Inventor
M. H. Mansfield
by
Munn, Fenwick & Lawrence

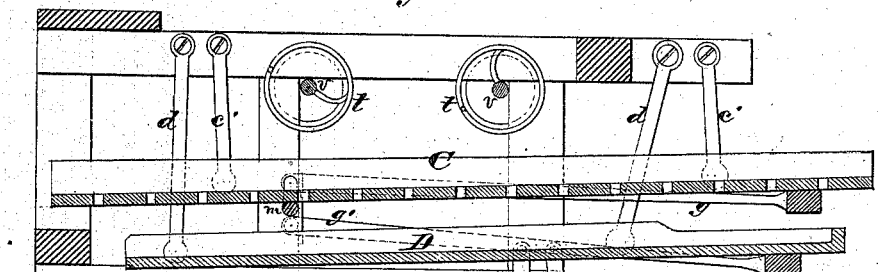
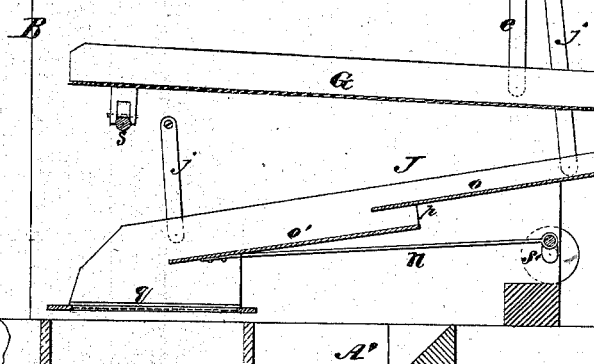
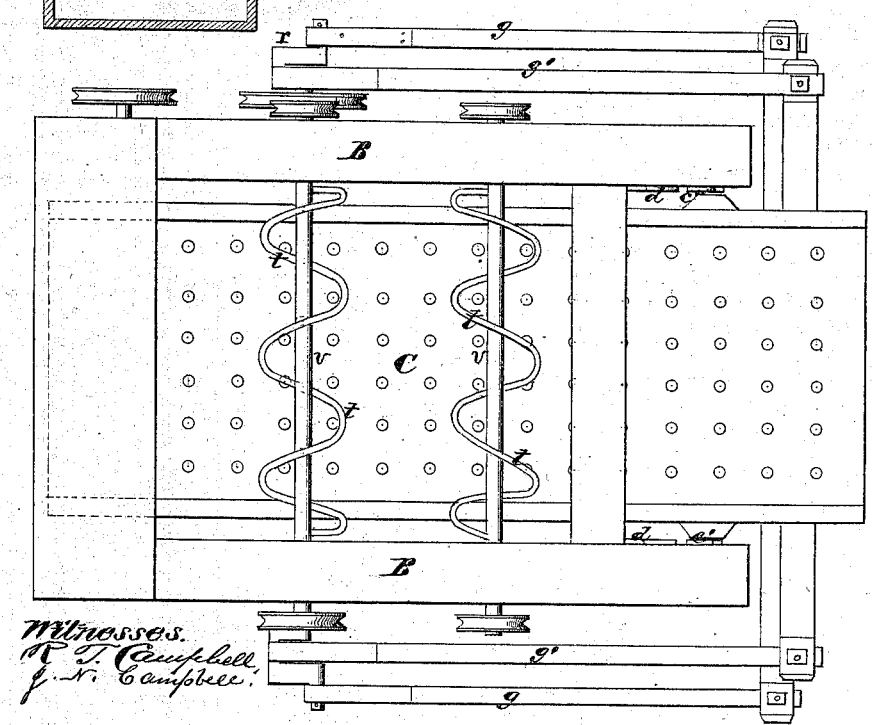

UNITED STATES PATENT OFFICE.

MARTIN H. MANSFIELD, OF ASHLAND, OHIO.

IMPROVEMENT IN THRASHING-MACHINES AND SEPARATORS.

Specification forming part of Letters Patent No. 115,223, dated May 23, 1871.

*To all whom it may concern:*

Be it known that I, MARTIN H. MANSFIELD, of Ashland, in the county of Ashland and State of Ohio, have invented certain new and useful Improvements in Hulling and Separating Machines; and I do hereby declare that the following is a full, clear, and exact description thereof, reference being had to the accompanying drawing making part of this specification, in which—

Figure 1:
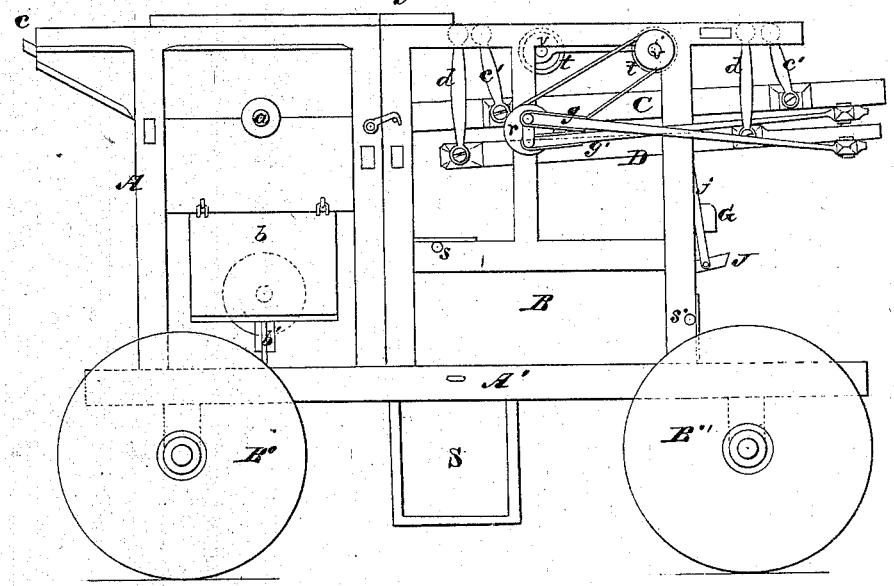
Figure 2:
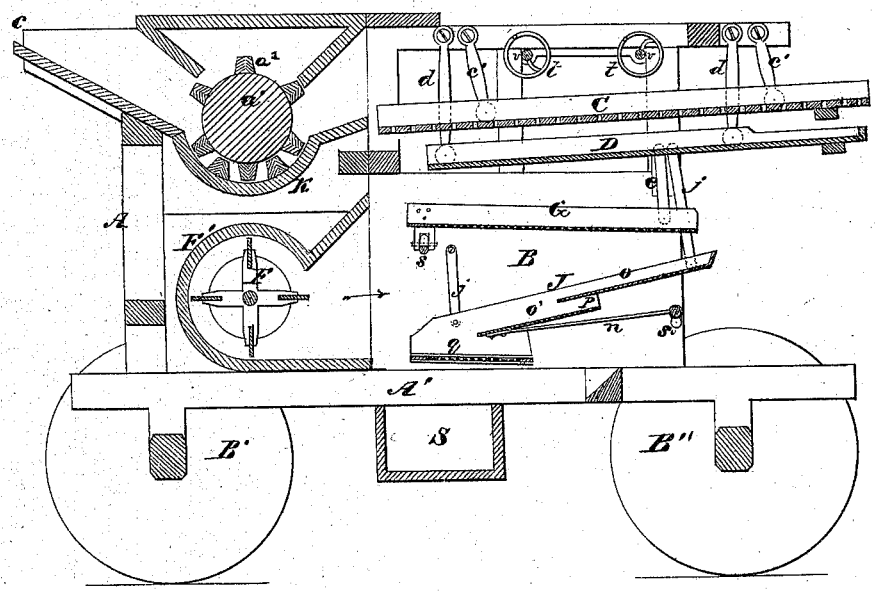

Figure 1, Plate 1, is an elevation of one side of the machine. Fig. 2, Plate 1, is a section taken longitudinally and vertically through the center of the machine. Fig. 3, Plate 2, is a vertical section through the cleaning and separating part of the machine, the thrashing and fanning devices not being shown. Fig. 4, Plate 2, is a top view of that part of the machine which is shown in section, Fig. 3.

Similar letters of reference represent corresponding parts in the several figures.

This invention relates to certain novel improvements which are applicable to the clover-seed thrashing, hulling, and separating machines, which are set forth in the schedules annexed to my Letters Patent of the United States numbered 43,217, and 56,583. The nature of my invention consists, first, in improving the shoe, which has an inclined single or double bottom, by the combination therewith of a screen, which will prevent any heavy foreign substances that have not been separated from the seed, when about to fall into the discharge-spout, from being discharged with the seed into said spout, as will be hereinafter explained; second, in the arrangement over the straw-carrier or separator, of two or more right-and-left screw-beaters, which, when they are rotated, will stir the straw and move it back and forth laterally while passing over said carrier, thereby greatly facilitating the separation of the seed and their escape from the straw, as will be hereinafter explained; third, in the combination, with a longitudinally-swinging straw-carrier and a table, of double throw-cranks and pitman-rod connections, whereby the said carrier and table receive from a single shaft independent alternate shaking movements, as will be hereinafter explained; fourth, in the application of curtains or shields to the open ends of the fan-box in such manner as will, in a great degree, prevent straw and chaff from being drawn into said box through said openings, as will be hereinafter explained.

The following description will enable others skilled in the art to understand my invention.

In the accompanying drawing, Plate 1, A represents that part of the frame of the machine which contains the thrashing and winnowing devices; and B represents that part of the frame which contains the screening and separating devices. Those parts of the machine which are inclosed in the frame A may be made precisely in the manner described and shown for corresponding parts in my Letters Patent numbered 43,217 and 56,583. The material is supplied to the machine over the inclined feed-board $c$ and brought under the influence of thrashing and hulling-teeth $a^2$ on the drum $a^1$, after which the material is delivered upon a carrier, C. Beneath the thrashing and hulling-drum is a fan-case, F', inclosing a blast-fan, F. The ends of the fan-case are open and provided with guards $b$, one of which is shown in Fig. 1, for preventing chaff and straw from being drawn into the fan-case. The guards $b$ may be simply boards, which are hung from above and sustained in an inclined position by props $b'$. These guards or hoods $b$ are removable. The frames A B are mounted upon sills A', which are sustained by transporting-wheels B' B'. The carrier C has a perforated bottom, and is suspended by means of arms $c'$ $c'$, so as to swing freely in a longitudinal direction. Beneath this carrier and separator C is a swinging table, D, having an imperforated bottom for receiving the seed and impurities which fall through the carrier, and delivering them upon a screen, G. The table D is suspended by arms $d$ so as to swing freely in a longitudinal direction. The straw-carrier and separator C and its underlying table D have two pitmen-rods, $g$ $g'$, attached to them on each side. These rods are attached to double throw-cranks $r$ on the ends of a transverse shaft, $m$. These double throw-cranks on the shaft $m$ give independent movements to the carrier C and table D, so that as one of these is moved forward the other will be moved backward. The straw-carrier C has arranged above it two stirring screws or beaters, $t$ $t$, which are intended to facilitate the separation of the seed from the straw as the latter is moved longitudinally over the carrier. Each beater $t$ is composed of a rod wound helically, and connected by its extremities to a horizontal transverse rod, $v$. The rods $v\ v$ are provided with belt-pulleys on their ends, and are both rotated in the same direction; the beaters are, however, coiled in opposite directions, so that while one of them moves the straw toward the right side of the machine the other will move the straw in the opposite direction. These helical or screw-beaters, which are light and open, stir and move the straw about on the carrier in such a manner as to greatly facilitate the separation of the seed from it. Beneath the table D is a screen, G, which is suspended by arms $e$ at one end, and supported at the other end by cranks formed on a shaft, S. The arms $e$ allow the screen G to swing longitudinally, while the cranks on shaft S give a vertical or tossing motion to the screen. Beneath the screen G is the separating-shoe J, which is suspended by arms $j\ j$ so as to swing longitudinally, which motion is imparted to it by means of a crank, $s'$, and connecting-rod $n$. The bottom of the shoe upon which the seed falling from the screen is received consists of two inclined imperforated boards, $o\ o'$, arranged in different planes, and so that the lower end of the upper board will lie a little over the upper end of the lower board and leave a space, $p$, between them, as shown in Figs. 2 and 3; or the bottom of this shoe J may be made with a single board, and the dust and chaff blown off between this board and the screen $q$ by the blast from the fan F. The lower end of the lower board $o$ lies over a screen, $q$, which is applied to and forms part of the shoe J.

The stepped arrangement of the boards $o\ o'$ is fully explained in the schedule annexed to my Letters Patent numbered 56,583, and is not claimed under this petition.

The screen $q$, combined with the two boards $o\ o'$, or with a single board, is an improvement on separator-shoes, as by its use the seed will be separated from heavy impurities which may have escaped separation up to this point in the operation; consequently the seed will fall into the delivery-spout S pure. This screen $q$ also retains the seed in the shoe long enough to allow blasts of air from fan F to blow away the impurities beneath the shoe $r$. The screen $q$ may be movable or it may be permanently attached to the shoe.

It will be seen from the above description, first, that I combine a separating-screen with a shoe, the bottom of which is so constructed that the blast from the fan F will be directed through the seed as it falls from a higher to a lower surface, and thus blow away all the light impurities, and when the seed thus purified falls upon the screen on its way into the discharge-spout it will be separated from the heavier impurities; second, that I employ rotary screw-stirrers in combination with the straw-carriers, which stirrers will move the straw about laterally in such manner that the seed will be readily separated from it and discharged through the bottom of the carrier upon the table beneath; third, that I give longitudinal reciprocating motions to the straw-carrier and its table by means of two throw-cranks on the ends of a single shaft; fourth, that I exclude foreign substances from the fan-case by the application of curtains to the openings at its ends.

Having described my invention, what I claim as new, and desire to secure by Letters Patent, is—

1. The vibrative shoe J, constructed with an imperforated step or steps, $o\ o'$, and screen $q$ at its front end, and arranged as shown, in combination with the cylinder $a^1$, straw-carrier C, grain-receiving table D, vibrating screen G, fan F, and spout S, substantially in the manner and for the purpose described.

2. The open rotary-screw beaters $t$, in combination with a straw-carrier of a separating-machine, substantially as and for the purpose described.

3. The arrangement of the pitmen $g\ g'$ and double throw-cranks $r\ r$ on the outside of the frame of the machine with suspenders $d\ d\ c'\ c'$, straw-carrier C, and grain-table D, all in the manner and for the purpose described.

4. The arrangement of the adjustable and removable curtains $b$ and adjusting device $b'$ upon the end of the fan-case, and in relation to the wheels B′ of the carriage, all in the manner shown and described.

5. The arrangement of shoe J, constructed as described, in relation to the hulling or thrashing-cylinder, discharge-spout, and blast-fan, all substantially in the manner specified and shown.

MARTIN H. MANSFIELD.

Witnesses:
G. S. FRANTZ,
J. D. JONES.